Patented May 4, 1948

2,440,808

UNITED STATES PATENT OFFICE 2,440,808

SUSPENSION POLYMERIZATION

Harry T. Neher, Bristol, and Frank J. Glavis, Elkins Park, Pa., assignors to Röhm & Haas Company, Philadelphia, Pa., a corporation of Delaware No Drawing. Application June 6, 1944, Serial No. 539,009

12 Claims. (Cl. 260—80)

This invention relates to a process of polymerizing ethenoid monomers. It relates to a method of polymerizing unsaturated organic compounds in aqueous suspension whereby polymeric ethenoid products are obtained in the form of small, discrete, granular or globular particles.

The process comprises suspending a polymerizable ethenoid monomer in water containing, as a dispersing or suspending agent, a hydrous, complex magnesium silicate which swells in water and forms gels therewith. The monomeric material, while in suspension, is subjected to polymerizing conditions and is converted into a granular or globular form which is then separated, washed, and dried. The polymeric material in granular or globular form is suitable for molding by conventional methods such as extrusion, compression, injection, and the like, or it may be milled or rolled into a sheeted form.

It is well known to prepare ethenoid polymers by first emulsifying the corresponding monomeric material and then polymerizing it while maintaining it in an emulsified form. Such a method, known as "emulsion polymerization," is described in United States Patent No. 2,123,599. The process, however, has the disadvantage that the emulsions must be coagulated. The polymeric materials then separate from the aqueous phase in a large mass which is not easily freed of occluded impurities.

Another process, known as "suspension polymerization," is considered to have definite advantages over the method just described. In this process, use is made of a dispersing agent and the rate of agitation is so regulated that the somewhat larger particles of the material to be polymerized remain in suspension during agitation but later settle freely when agitation is suspended. The need of coagulation is, therefore, eliminated, and the product is obtained directly in a granular or globular form which may be washed and purified very convieniently. The suspension method of preparing ethenoid polymers is also known as "granulation polymerization" in contrast to "emulsion polymerization" and is discussed, for example, in United States Patents Nos. 2,108,044; 2,122,886; 2,171,765; 2,133,257, and 2,265,242.

Although many materials, such as methyl cellulose, polyvinyl alcohol, sodium alginates, gum tragacanth, karaya gum, and sodium polyacrylate, have been suggested as dispersing agents in suspension polymerization, it has been found that superior results and a product of considerably higher purity are obtained by using, as a dispersing agent, a hydrous, complex magnesium silicate which swells in water and forms gels therewith. Not only do the complex magnesium silicates provide excellent dispersion of the monomeric material, but they do not affect the rate of polymerization. Furthermore, they may be washed from the granulated polymeric material very readily and, hence, do not contaminate the final product in any way nor affect its natural color. Specifically, the employment of the dispersing agents disclosed herein has made it possible to suspend and polymerize in a granular form many materials, such as actyl methacrylate, which cannot be successfully prepared in granular form by the use of dispersing agents known heretofore. Furthermore, the suspension polymerization process using the complex magnesium silicates is less sensitive to small variations in operating technique, and the results, therefore, are more uniform and consistent. Also, comparatively small amounts of the complex magnesium silicates are required.

The dispersing agents employed in accordance herewith are the hydrous, complex magnesium silicates which swell in water and are capable of forming gels therewith. The commonest sources of the gel-forming magnesium silicates at present are the naturally occurring saponites, a typical formula of which is $2MgO \cdot 3SiO_2 \cdot nH_2O$. Varieties of saponite available commercially are hectorite and magnesium silicate wax.

The complex magnesium silicates, for example, magnesium silicate wax, may be powdered and added under continued agitation to a large volume of water. About 50 to 100 milliliters of water is used for each gram of the "wax," for example. Agitation is continued until a substantially uniform gel is obtained. This may require from several minutes to a few hours. The resultant gel may be used as such or may be clarified. It may be supercentrifuged to remove insoluble impurities. Preferably, the centrifuged gel is dried and retained for subsequent use. This product is particularly satisfactory because it disperses in water in a matter of a few minutes with a minimum of agitation.

The ethenoid polymers which may be prepared in granular or globular form by this process are those prepared from ethenoid monomers which are insoluble in water and which contain in their structural configuration a single $>C=C<$ group. The preferred ethenoid polymers which may be obtained in granular form by this process are polyvinyl halides such as polyvinyl chloride, polyvinyl esters such as polyvinyl acetate, especially when copolymerized with polyvinyl halides, polystyrene, polymeric esters of acrylic and α-substituted acrylic acids, such as ethyl acrylate, methyl methacrylate, octyl methocrylate, and benzyl methocrylate, polymeric nitriles and water-insoluble substituted amides of said acids such as acrylonitrile, methocrylonitrile, diethyl acrylamide, copolymers of the esters of acrylic and α-substituted acrylic acids with themselves and/or other polymerizable materials such as acrylonitrile, acrylamide, methocrylamide, styrene, vinyl halides and esters, and copolymers of vinyl halides with unsaturated esters such as diallyl maleate, dimethyl maleate, and the like.

Our preferred process comprises first preparing an aqueous gel by dispersing the complex magnesium silicate in water and heating same to a temperature at which the ethenoid material polymerizes satisfactorily. The amount of complex magnesium silicate suspended in the aqueous phase may vary. A minimum amount of the complex magnesium silicate equal to about 0.1% based on the weight of material to be dispersed appears to be necessary. Greater amounts are preferred. The maximum amount is determined particularly by a consideration of economy and of the specific material to be polymerized. Ordinarily, 2.5% is adequate. While the aqueous phase is agitated, the monomeric material is added thereto. As indicated above, the monomeric material may be a single monomer or a mixture of copolymerizable materials. Furthermore, modifying agents, such as coloring materials, plasticizers, resins, and polymerization catalysts, such as organic peroxides, may be admixed with the monomeric material. Alternatively, polymerization catalysts such as inorganic peroxides or per-salts may be dissolved in the aqueous phase. Heating and agitation are continued until polymerization is substantially complete. Thereafter, agitation is stopped and the polymeric material in granular form is separated, for example, by filtration from the aqueous phase and is washed free of impurities. The product in a granulated or globular form is particularly characterized by a high degree of purity.

The temperature of polymerization may be varied widely, depending on the particular monomer undergoing polymerization. Because polymerization proceeds more rapidly at higher temperatures, it is desirable that the dispersion be at least warmed. The upper limit is the boiling point of the aqueous phase, and this may be varied by changes in pressure.

The following examples are given by way of illustration only.

Example 1

A two-liter, three-necked flask, equipped with a reflux condenser, thermometer, and oil-sealed mechanical stirrer, was charged with 800 millimeters of distilled water and 0.5 gram of magnesium silicate wax. The mixture was stirred rapidly for approximately one hour, during which the wax became uniformly dispersed as a gel. Two hundred grams of methyl methacrylate, containing 0.5 gram of benzoyl peroxide, was added and the mixture was then heated to 30°–85° C. and maintained at this temperature for two hours, during which the methyl methacrylate polymerized substantially completely. Agitation was halted and the batch allowed to cool. The polymethyl methacrylate was separated by filtration as a fine white powder and was washed several times with warm water to remove any extraneous material. The product, after being dried overnight at 75°–80° C., weighed 185 grams and was suitable for injection molding.

Example 2

Example 1 was repeated with one exception, namely, that 0.75 gram of magnesium silicate wax was used instead of the 0.5 gram used above. Again, 185 grams of dried product was obtained which was capable of being used as such in molding powders.

In the three following examples, the same equipment was used and the same procedure followed as described above.

Example 3

A polymer was prepared from 200 grams of methyl acrylate, using 2.0 grams of magnesium silicate wax. The product was 190 grams of a white granular powder ready for use in molding operations such as injection and extrusion.

Example 4

A polymer of octyl methacrylate was prepared by polymerizing 235 grams of octyl methacrylate containing 2.35 grams of benzoyl peroxide in an aqueous dispersion of magnesium silicate wax as in Example 1. The polymer, in the form of fine pearls, was washed with ice water in order to prevent adhesion between the particles. The yield was 225 grams.

Example 5

Two hundred ninety-five grams of polybenzyl methacrylate in granular form was obtained in accordance with the procedure of Example 1 by polymerizing 300 grams of monomeric benzyl methacrylate containing three grams of benzoyl peroxide.

Example 6

To a one-gallon autoclave was charged 11 grams of magnesium silicate wax dissolved in 1,700 milliliters of distilled water, 3.0 grams of bezoyl peroxide dispersed in 50 milliliters of methanol, and 960 grams of vinyl chloride. The reaction mixture was agitated (revolutions per minute=259) and heated at a batch temperature of 62°–64° C. until the pressure had fallen to such a point that the completion of the polymerization was indicated. This required twenty-two hours. After being cooled to room temperature, the autoclave was vented. No caking was observed. The polymer was washed with water and dried and was obtained in the form of a fine white powder.

Example 7

Using the technique and equipment of Example 6, a copolymer of vinyl chloride and methyl acrylate was prepared. The monomeric mixture consisted of 3.0 grams of benzoyl peroxide dissolved in 95 grams of methyl acrylate and 960 grams of vinyl chloride. The product was obtained in the form of a white powder which was easily molded and sheeted.

Example 8

A copolymer was prepared by the process of Example 6. The monomeric mixture consisted of 960 grams of vinyl chloride, 96 grams each of dimethyl maleate and diethyl maleate, 3.5 grams of benzoyl peroxide; and the aqueous phase contained 11.5 grams of magnesium silicate wax in 1700 milliliters of water. The polymerizing temperature was maintained for twenty hours. The product, after being washed and dried, was obtained in the form of small pearls which were very satisfactory as components of molding powders.

Example 8 was repeated as described above with one exception. Other dispersing agents were substituted for the complex magnesium silicate. For example, 0.2% of methyl cellulose, 0.7% of polyvinyl alcohol, 2.7% of saponin, 0.7% of sodium silicate, 2.5% of tragacanth gum, and 0.9% of ammonium polyacrylate (all percentages based on weight of monomer) were used individually. In every case, the polymer was obtained in the form of a coagulated lump instead of in the form of fine granules or pearls.

Ordinarily, metals exert a definite influence on the rate of polymerization and the physical form of the polymer. When, however, complex magnesium silicates are employed as dispersing agents, the course of polymerization does not appear to be affected by metals and the polymer is obtained in granular form. The use of complex magnesium silicates assures consistent results, makes it possible to polymerize, in a granular form, many materials which have not been obtainable in this form heretofore, and provides a method which is straightforward and capable of being conducted with ease.

We claim:

1. In the process of polymerizing in granular form a monomeric, water-insoluble, polymerizable ethenoid material dispersed in water, said material containing in its structural configuration a single >C=C< group, the step which comprises incorporating in the water as a dispersing agent a complex, hydrous magnesium silicate which swells in water and forms gels therewith, said silicate being present to the extent of 0.1% to 2.5% of said ethenoid material.

2. In the process of copolymerizing in granular form a water-insoluble mixture of polymerizable ethenoid materials dispersed in water, said materials containing in their structural configuration a single >C=C< group, the step which comprises incorporating in the water as a dispersing agent a complex, hydrous magnesium silicate which swells in water and forms gels therewith, said silicate being incorporated in an amount which is from 0.1% to 2.5% of the amount of said ethenoid materials.

3. In the process of polymerizing in granular form a water-insoluble, copolymerizable mixture of vinyl chloride and vinyl acetate dispersed in water, the step which comprises incorporating in the water as a dispersing agent a complex, hydrous magnesium silicate which swells in water and forms gels therewith, said silicate being used in an amount which is from 0.1% to 2.5% of the amount of said copolymerizable mixture.

4. In the process of polymerizing in granular from a water-insoluble, copolymerizable mixture of ethyl acrylate and methyl methacrylate dispersed in water, the step which comprises incorporating in the water as a dispersing agent a complex, hydrous magnesium silicate which swells in water and forms gels therewith, said silicate being used in an amount which is from 0.1% to 2.5% of the amount of said copolymerizable mixture.

5. In the process of polymerizing in granular form a monomeric, water-insoluble, ethenoid material having a single ethylenic linkage per molecule and comprising a vinyl halide dispersed in water, the step which comprises incorporating in the water as a dispersing agent a complex, hydrous magnesium silicate which swells in water and forms gels therewith, said silicate being incorporated to the extent of 0.1% to 2.5% of the weight of said ethenoid material.

6. In the process of polymerizing in granular form a monomeric, water-insoluble, ethenoid material having a single ethylenic linkage per molecule and comprising vinyl chloride dispersed in water, the step which comprises incorporating in the water as a dispersing agent a complex, hydrous magnesium silicate which swells in water and forms gels therewith, said silicate being incorporated to the extent of 0.1% to 2.5% of the weight of said ethenoid material.

7. In the process of polymerizing in granular form a monomeric, water-insoluble, ethenoid material having a single ethylenic linkage per molecule and comprising an ester of methacrylic acid dispersed in water, the step which comprises incorporating in the water as a dispersing agent a complex, hydrous magnesium silicate which swells in water and forms gels therewith, said silicate being incorporated to the extent of 0.1% to 2.5% of the weight of said ethenoid material.

8. In the process of polymerizing in granular form a monomeric, water-insoluble, ethenoid material having a single ethylenic linkage per molecule and comprising methyl methacrylate dispersed in water, the step which comprises incorporating in the water as a dispersing agent a complex, hydrous magnesium silicate which swells in water and forms gels therewith, said silicate being incorporated to the extent of 0.1% to 2.5% of the weight of said ethenoid material.

9. A process for the preparation of ethenoid polymers in granular form which comprises dispersing in water a complex hydrous magnesium silicate which is characterized by swelling in water and by forming gels therewith, mixing with the resulting dispersion a water-insoluble polymerizable ethenoid monomer containing a single >C=C< group per molecule, the silicate being used in an amount which is 0.1% to 2.5% of said monomer, agitating the resulting mixture to form a suspension of said monomer, polymerizing the monomer in suspension, and separating the resulting discrete particles of polymeric material.

10. A process for the preparation of ethenoid polymers in granular form which comprises dispersing in water a complex hydrous magnesium silicate which is characterized by swelling in water and by forming gels therewith, mixing with the resulting dispersion water-insoluble polymerizable ethenoid material comprising a vinyl halide, said material having a single ethylenic linkage per molecule, the silicate being used in an amount which is 0.1% to 2.5% of said material, agitating the resulting mixture to form a suspension of said material, polymerizing the material in suspension, and separating the resulting discrete particles of polymeric material.

11. A process for the preparation of ethenoid polymers in granular form which comprises dispersing in water a complex hydrous magnesium silicate which is characterized by swelling in water and by forming gels therewith, mixing with the resulting dispersion water-insoluble polymerizable ethenoid material comprising an ester of methacrylic acid, said material having a single ethylenic linkage per molecule, the silicate being used in an amount which is 0.1% to 2.5% of said material, agitating the resulting mixture to form a suspension of said material, polymerizing the material in suspension, and separating the resulting discrete particles of polymeric material.

12. A process for the preparation of ethenoid polymers in granular form which comprises dispersing in water a complex hydrous magnesium silicate which is characterized by swelling in water and by forming gels therewith, mixing with the resulting dispersion water-insoluble polymerizable ethenoid material comprising methyl methacrylate, said material having a single ethylenic linkage per molecule, the silicate being used in an amount which is 0.1% to 2.5% of said material, agitating the resulting mixture to form a suspension of said material, polymerizing the material in suspension, and separating the resulting discrete particles of polymeric material.

HARRY T. NEHER.
FRANK J. GLAVIS.

REFERENCES CITED

The following references are of record in the file of this patent:

UNITED STATES PATENTS

| Number | Name | Date |
| --- | --- | --- |
| 2,023,540 | Painter et al. | Dec. 10, 1935 |
| 2,133,257 | Strain | Oct. 11, 1938 |
| 2,171,765 | Rohm et al. | Sept. 5, 1939 |
| 2,279,436 | Berg | Apr. 14, 1942 |